United States Patent Office.

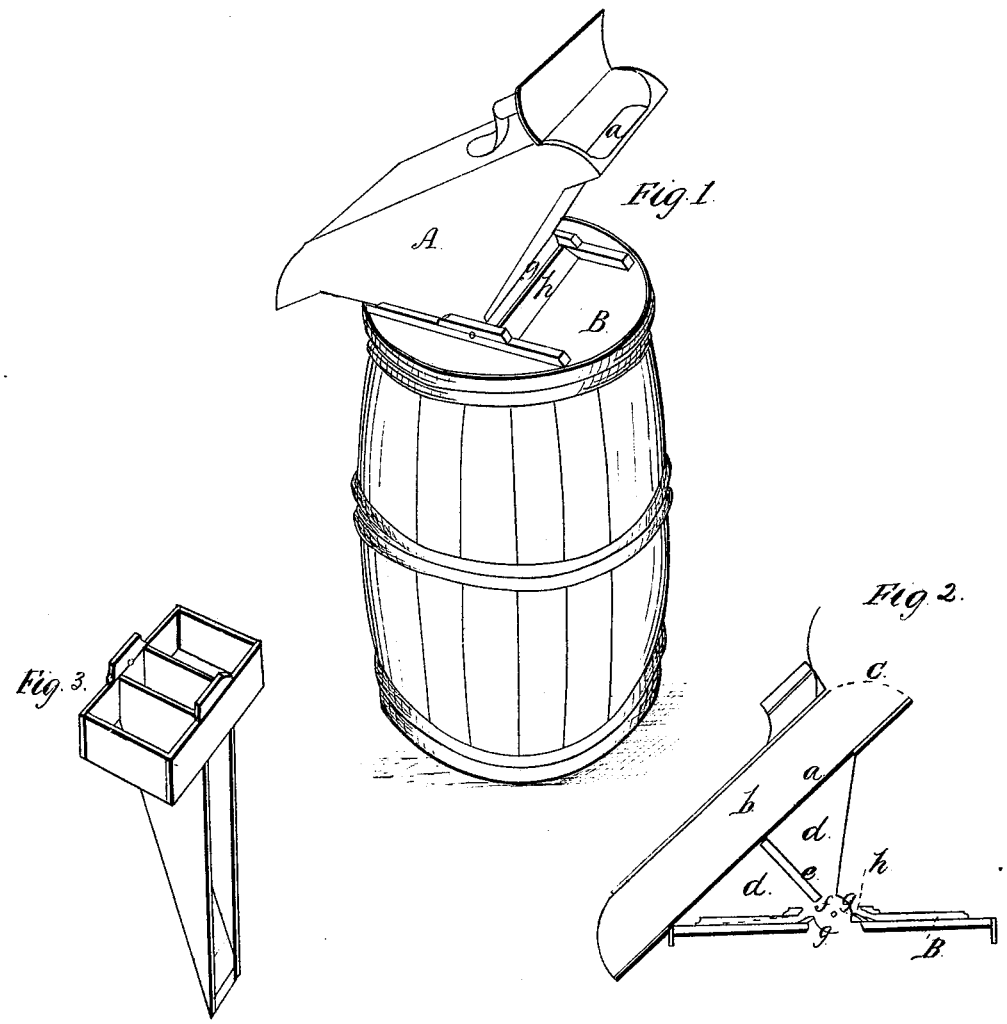

DE WITT STEVENS, OF NEWARK, NEW JERSEY.

Letters Patent No. 91,491, dated June 15, 1869.

IMPROVED ASH-SIFTER.

The Schedule referred to in these Letters Patent and making part of the same.

*To all whom it may concern:*

Be it known that I, DE WITT STEVENS, of Newark, in the county of Essex, and State of New Jersey, have invented a new and improved Ash-Sifter; and I do hereby declare that the following is a full, clear, and exact description of the construction and operation of the same, reference being had to the annexed drawings, making a part of this specification, in which—

Figure 1 is a perspective view of the sieve mounted on the cover of a barrel.

Figure 2 is a longitudinal section.

Figure 3 is a perspective view of the chute or channel upon which the sieve is mounted when it is attached to a privy or other fixture.

My invention consists of a reversible inclined screen or tilting-sieve, $a$, enclosed in a shell or case, A, and pivoted upon the cover B of a barrel, box, or other receptacle, or pivoted upon a chute or channel, fig. 3, when the ashes or other substances are to be deposited in a vault, bin, or other fixture.

Above the screen $a$ is an enclosed space, $b$, with mouth $c$, and hinged lid, and below the screen $a$ is an enclosed space, $d$, with guide $e$, and terminating in a slot or narrow aperture, $f$, the sides of which form circular flanges $g$, which fit closely, by means of rubber strips $h$, into another slot in the cover B; and the case is secured to the cover B, or other support, fig. 3, by a rod, which passes through the sides of the case A, and between the circular flanges $g$, and forms the axis for its movement.

The sieve is operated as follows:

Empty the ashes, or other materials to be separated, into the mouth $c$ of the apparatus. They will roll down the screen $a$, the fine particles falling through. Now tip the sieve, i. e., reverse the incline, and the cinders or coarser parts will return to the scuttle, the finer particles having an opportunity to escape at each movement, directed by the guide $e$, through the dust-proof vent and slotted cover, into the receptacle below.

The advantages of my screen, as compared with those in general use, are, its qualities of self-sifting, self-dumping, and freedom from dust, rendering it available for in-door use; also, when attached to privies, it forms an easy and convenient mode of transferring to their vaults earth, coal-ashes, or other absorbing and deodorizing materials, which, as the screen is used daily, would purify and dry the vault, and form an inodorous and easily-transported compost, tending to popularize the movement for sanitary and agricultural reforms in the disposition of animal refuse.

I claim as new, and desire to secure by Letters Patent—

A reversible inclined sieve, with enclosed spaces above and below the screen, with guide and central dust-proof vent, substantially as constructed, for the purposes set forth.

DE WITT STEVENS.

Witnesses:
JOHN J. SLOATE,
EDWARD L. CONKLIN.